United States Patent [19]
Geipe

[11] Patent Number: 6,077,077
[45] Date of Patent: Jun. 20, 2000

[54] ARCHITECTURE AND PROCESS FOR SIMULATING THE DATA TRANSMITTED TO A NAVIGATION MANAGEMENT COMPUTER

[75] Inventor: Myron H. Geipe, Euless, Tex.

[73] Assignee: American Airlines, Fort Worth, Tex.

[21] Appl. No.: 08/861,984

[22] Filed: May 22, 1997

[51] Int. Cl.[7] .............................. G09B 9/08; G09B 19/16
[52] U.S. Cl. ................................ 434/30; 434/29; 434/35; 340/945; 701/200
[58] Field of Search ........................ 434/29–38, 47, 434/49, 62–66, 308, 365, 41, 43–45, 51, 55, 59, 69, 111, 307 R; 701/120, 200, 300, 301, 18; 340/945, 961, 990, 963, 970; 73/178 R; 348/117; 342/361, 456; 345/139; 381/309, 74

[56] References Cited

U.S. PATENT DOCUMENTS

| | | | |
|---|---|---|---|
| 4,337,045 | 6/1982 | Jones et al. ................................ 434/29 |
| 4,442,491 | 4/1984 | Olhausen, Jr. ......................... 434/30 X |
| 4,642,775 | 2/1987 | Cline et al. .............................. 701/200 |
| 4,672,438 | 6/1987 | Plante et al. ........................ 434/111 X |
| 4,675,675 | 6/1987 | Corwin et al. ..................... 73/178 R X |
| 4,975,696 | 12/1990 | Salter, Jr. et al. ................... 340/973 X |
| 5,017,141 | 5/1991 | Relf et al. ............................. 434/30 X |
| 5,051,094 | 9/1991 | Richter et al. ............................. 434/30 |
| 5,224,861 | 7/1993 | Glass et al. ........................... 434/30 X |
| 5,343,395 | 8/1994 | Watts ................................. 345/139 X |
| 5,632,622 | 5/1997 | Bothwell .............................. 434/30 X |
| 5,739,770 | 4/1998 | Liden ................................... 701/18 X |
| 5,807,109 | 9/1998 | Tzidon et al. ........................ 434/30 X |
| 5,854,843 | 12/1998 | Jacknin et al. .......................... 381/309 |
| 5,892,462 | 4/1999 | Tran ....................................... 340/961 |

*Primary Examiner*—Joe H. Cheng
*Attorney, Agent, or Firm*—Gray Cary Ware & Freidenrich, LLP

[57] ABSTRACT

A system for flight training and simulation that reduces the time spent by a student or pilot inside the simulation cockpit in programming navigation systems. The system comprises a simulation workstation that interfaces with one or more automated navigational devices inside the cockpit. From the workstation the student enters and stores a flight plan and other flight conditions which are communicated to the automated navigational devices during training. A frame relay device redirects data flow inside the cockpit from the onboard aircraft communications and reporting system to the simulation workstation. The simulation workstation contains a flight data interface board that is configured to communicate with the automated navigational devices. The board contains a transmitter/receiver chip set that supports known avionics communications protocols for data transfers with the automated navigational devices inside the cockpit.

18 Claims, 10 Drawing Sheets

ARCHITECTURE AND PROCESS FOR SIMULATING THE DATA TRANSMITTED TO A NAVIGATION MANAGEMENT COMPUTER

TECHNICAL FIELD

The present invention relates in general to the field of flight simulators and more specifically to a workstation-based system and process for transferring flight data to existing navigational equipment found in current flight simulators.

BACKGROUND OF THE INVENTION

The expense and complexity of modern military and civilian aircraft has lead to an increase in the utilization of sophisticated training devices, such as flight simulators. Such devices typically employ simulation cockpits similar to those found on actual aircraft. Most flight simulators use a display terminal to render electronic images that anticipate expected flight conditions for a given flight plan or set of flying conditions. The simulation cockpit may also utilize hydraulic actuators to simulate movement of the aircraft.

The instrumentation typically used in such flight simulator devices in the past has been implemented utilizing actual instrumentation. Modern avionics instruments, however, are quite expensive and the utilization of such instruments within a training session can be prohibitively costly.

One factor that directly impacts the cost of using flight simulators is the time spent by the student or pilot in the simulation cockpit. Flight training takes time away from a pilot's commercial air time impacting the airline's bottom line. Additionally, the flight training requirements imposed on pilots and the limited availability of flight simulation equipment means that equipment must be shared. Furthermore, long training sessions limit the number of pilots that can use the equipment over a given period of time and effect the efficiency of the training session.

With typical flight simulators, the student is required to load a flight plan prior to the training session. This usually involves entering origin to destination data, weather conditions data, cargo and gross weight data and other cruising conditions data into the automated navigational device of the simulation cockpit. The manual entry of this flight information inside the simulation cockpit takes a considerable period of time and increases the overall length of the training session.

Thus, a need exists for a way to reduce the time a training student or pilot consumes in the simulation cockpit. The present invention is a device and method that eliminates the need for manual entry of flight plan data inside the simulator and, thus, conserves valuable simulation training time.

SUMMARY OF THE INVENTION

The present invention, according to one embodiment, is a system for flight training and simulation comprising a simulation cockpit having one or more automated navigational devices from which the student enters and chooses a plurality of flight plan options. An onboard Aircraft Communications and Reporting System ("ACARS") is also provided for uploading flight plans to the system. A data interface port is provided in the cockpit and provides an interface between the system and the outside world.

In one embodiment, a frame relay device having at least two switching positions is used to route signal pathways inside the cockpit. In one switching position, the relay forms a communications bridge between the automated navigational devices and the ACARS unit. In another switching position, the communications bridge is formed between the computers and the data interface port.

The data interface port is communicably connected to a simulation workstation inside a briefing room. The interface between the simulation workstation provides bidirectional communications between the automated navigational devices and the simulation workstation.

The simulation workstation contains a flight data interface board that is configured to communicate with the automated navigational devices. The board contains a transmitter/receiver chip set that supports known avionics communications protocols for data transfers with the automated navigational devices inside the cockpit. Various logic arrays and software application programs control the flow of data on the board.

The simulation workstation also contains a plurality of application programs that allow a student to enter and save a predefined flight plan and other flight related information. In this regard, a display and keyboard are provided.

BRIEF DESCRIPTION OF THE DRAWINGS

For a more complete understanding of the present invention, including its features and advantages, reference is now made to the following detailed description, taken in conjunction with the accompanying drawings. In the drawings.

Corresponding numerals and symbols in the different figures refer to corresponding parts unless otherwise indicated.

DETAILED DESCRIPTION OF THE PREFERRED EMBODIMENT

Figure 1:
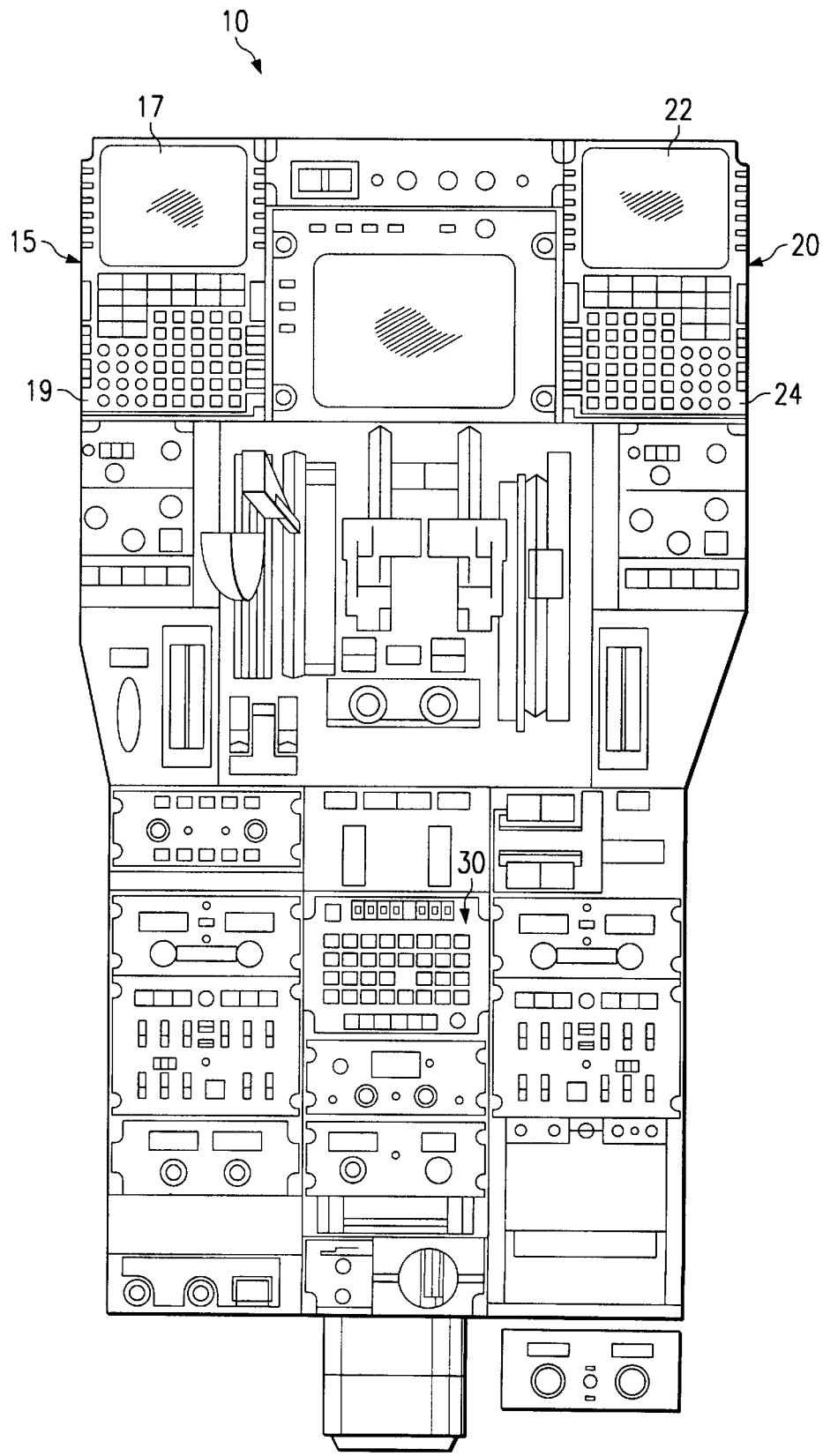
FIG. 1 depicts a front face view of a simulation cockpit.

Referring now to FIG. 1, a front face view of an instrument panel of the type found in a typical flight simulation cockpit is shown and denoted generally as 10. The instrument panel 10 is designed to provide a student or pilot the look and feel of a real aircraft and is appropriate for training purposes.

As shown in FIG. 1, panel 10 provides a plurality of gauges, dials, switches and other instruments which the student or pilot operates during training. In particular, the panel 10 has two automated navigational devices 15 and 20, which can be flight management systems, global positioning satellites or other similar navigational systems similar to those found on actual airplanes. The automated navigational devices 15 and 20 have integrated displays 17 and 22, respectively, which provide the student with a plurality of flight options, controls and information.

Also, each automated navigational device 15 and 20 has an integrated keyboard 19 and 24, respectively, which the student can use to input flight data and request flight plans. The information entered by the student can vary, depending on the type of training but may include such factors as origin and destination data, cargo weight data, velocity data and other flight variables.

The instrument panel 10 also features an Aircraft Communications And Reporting System 30("ACARS") which is used to retrieve and download predefined flight plans and other flight data into the automated navigational devices 15 and 20. Typically, the ACARS 30 communicates with an off-site computer which stores a plurality of predefined flight plans. The predefined flight plans are communicated to the ACARS 30 which, in turn, transmits the flight plans to the automated navigational devices 15 and 20. The predefined flight plans contain a plurality of variables for a given training session, including factors such as distance, velocity data, weather conditions, wind resistance, cargo data, weight, origin and destination data, and other flight information. In this way, a plurality of flight plans can be created at an off-site facility and communicated via the ACARS 30 to the automated navigational devices 15 and 20.

This process, however, is costly and inefficient since the flight plans and information have to be predefined days or even weeks earlier and then implemented into the simulation computer. The time spent in implementing a given flight plan increases both the cost of training and the time spent by the student in the simulation cockpit. The present invention, thus, reduces the time spent by the student or pilot by allowing the student to enter, save and retrieve flight plans and other flight variables prior to entering the cockpit.

Figure 2:
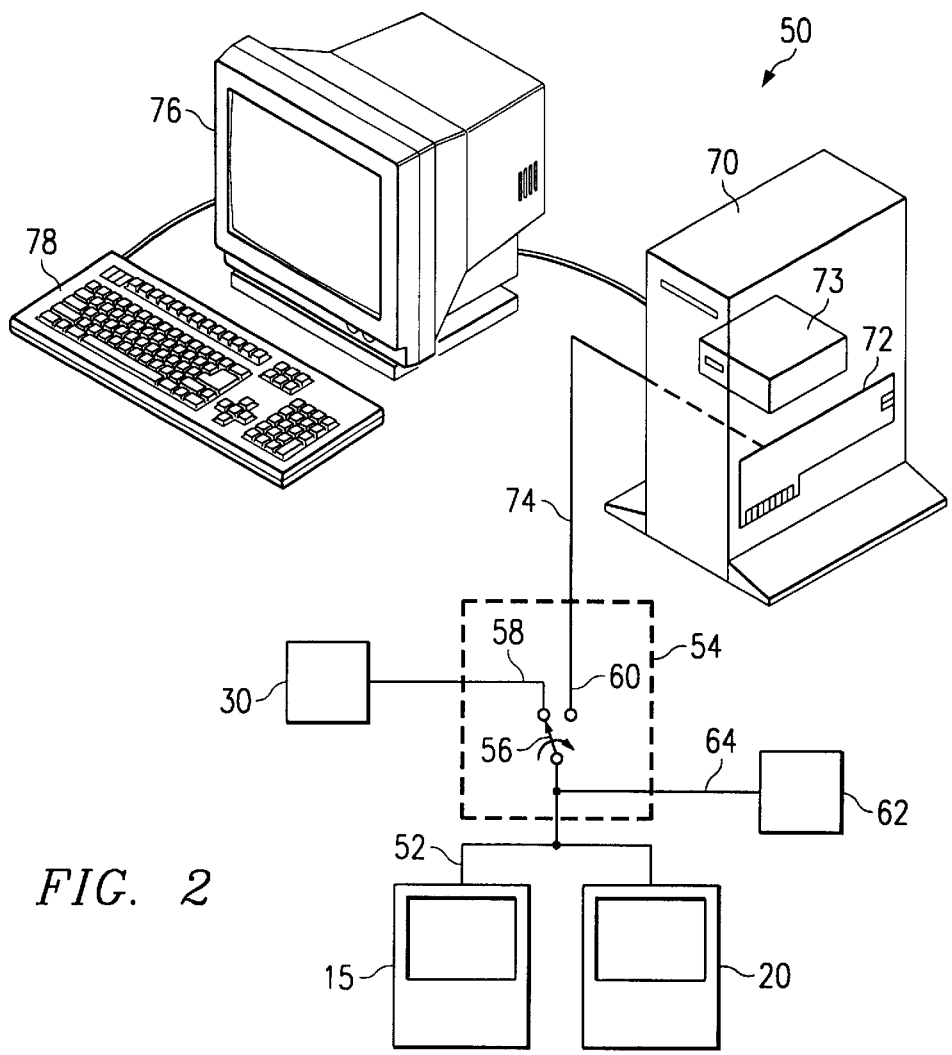
FIG. 2 is a high level architectural diagram of a flight information loading system according to one aspect of the invention.

Turning now to FIG. 2, a high level architectural diagram of a workstation based flight information loading system according to the present invention is shown and denoted generally as 50. System 50 has two automated navigational devices 15 and 20 which are identical or substantially similar to those shown in the simulation cockpit 12. The automated navigational devices 15 and 20 are, as before, coupled to the ACARS 30 via pathway 52.

According to one embodiment, a frame relay device 54 is provided with a switch 56 that toggles between two positions 58 and 60. The switch 56 completes the signal path in one position 58 between the automated navigational devices 15 and 20 and the ACARS 30. In its second position 60, the switch 56 forms a signal path between the automated navigational devices 15 and 20 and the simulation workstation 70 via path 74. In this way, the switch 56 controls the communications pathway between the automated navigational devices 15 and 20 and other components within the system 50.

In one embodiment, an instructor terminal 62 is provided and controllably linked to the frame relay device 54 via pathway 64. The instructor terminal 62 can be used to control the switching operation of switch 56 although other means of operating switch 56 may be provided.

The advantages of the present invention are realized when switch 56 is toggled to its second position 60. In that configuration, the automated navigational devices 15 and 20 are communicably linked to the workstation 70. The workstation 70 can be a desktop computer, notebook or other similar computing device that is less expensive to use, operate and maintain than the simulation cockpit 12.

In the switched configuration 60, data communications flow between the workstation 70 and the automated navigational devices 15 and 20. As described herein, the workstation 70 is configured and programmed to provide much of the functionality as the ACARS 30 so that predefined flight plans, take-off data, wind data and other flight related information normally obtained from the ACARS 30 can now be obtained from the workstation 70. In this way, a student or pilot can use the workstation 70 instead of the automated navigational devices 15 and 20 to create, save and retrieve flight data.

As shown, the workstation 70 has an interface board 72 which is communicably linked to the frame relay device 54 via pathway 74. In one embodiment, the interface board 72 is a standard personal computer ("PC") board which fits inside the slot of a standard PC. The interface board 72 is programmed and configured to support known avionics protocols such as ARINC 454, 429 or 724-B.

Also shown coupled to the workstation 70 is a display 76 and keyboard 78. In this way, the student or pilot can enter, select and view flight plan data and other flight related variables such as weather, velocity, gross weight and cargo weight into the workstation 70. The flight information can be saved in an internal storage device 73 such as magnetic drive, or similar apparatus. The information is then relayed to the interface board 72 and subsequently to the automated navigational devices 15 and 20 where the student or pilot can start flight training immediately. Since the flight plan data is entered outside the simulation cockpit 10, valuable simulator time is conserved.

While FIG. 2 illustrates the use of a frame relay device 54 to switch the workstation 70 in and out of the signal pathway to the automated flight management devices 15 and 20, it should be understood that the workstation 70 can be directly coupled to the navigational devices 15 and 20 at all times. With such an embodiment, the frame relay device and ACARS 30 are not present and communications flow directly between the interface board 72 and the devices 15 and 20.

Figure 3:
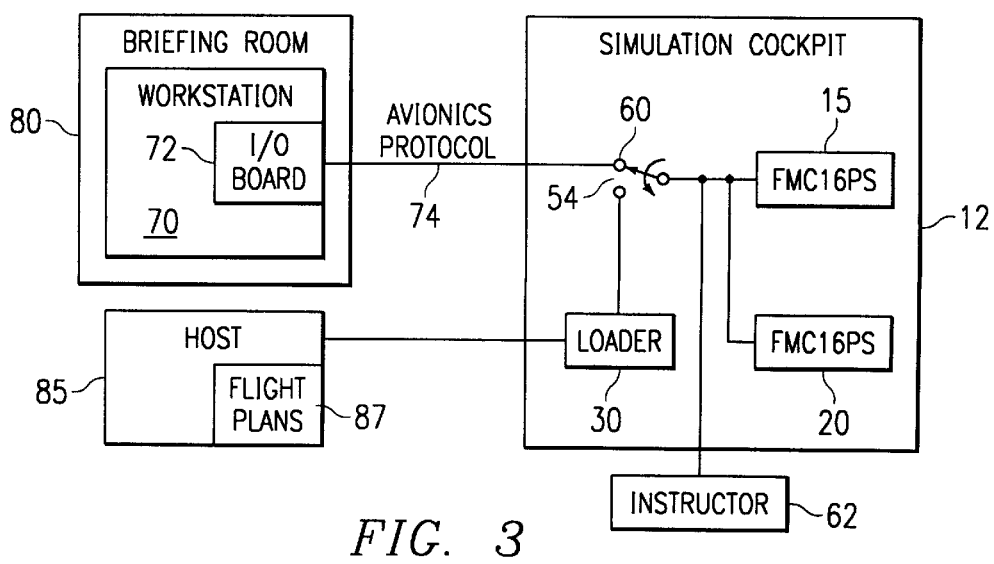
FIG. 3 is a block diagram of a flight training and simulation system according to one aspect of the invention.

FIG. 3 is a block diagram of a flight training and simulation system according to the present invention. Generally, the simulation cockpit 12 has two automated navigational devices 15 and 20 which can be used by a captain and first officer for training purposes. In use, the flight data is entered by the student or pilot inside the briefing room 80 prior to entering the simulation cockpit 12. The briefing room 80 can be used for a variety of purposes including maintenance training, diagnostic simulation and testing, non-aircraft training and maintenance or other similar environments. As shown the briefing room 80 and simulation cockpit 12 are communicably linked via interface 74 which supports a known avionics protocol.

The interface board 72 handles all the data transfers between the workstation 70 and the automated navigational devices 15 and 20. An instructor terminal 62 is provided for operating the switch 54 and creating a signal path between the automated navigational devices 15 and 20 and the interface board 72. In this way, the time the student or pilot spends loading predefined flight plans 87 from the host computer 85 via the ACARS 30 is conserved.

The main purpose of the interface board 72 is to transfer data between the workstation 70 and one or more automated navigational devices 15 and 22. In one embodiment, the interface board 72 uses an industry known 429 transmitter/receiver chip set in combination with internal memory to handle data transfers between the board 72 and the cockpit 10. The memory acts as an intermediary storage area for data flow between the workstation 70 and the transmitter/receiver chip set. A plurality of array logic circuits on the board 72 control the data flow to and from the workstation 72. Reading and writing certain registers on the board 72 will cause it to perform its various hardware functions.

Thus, the present invention encompasses the use of an interface board 72 that communicates with the automated navigational devices 15 and 20 and provides the functionality of the ACARS 30 found in the simulation cockpit 12.

Figure 4A:
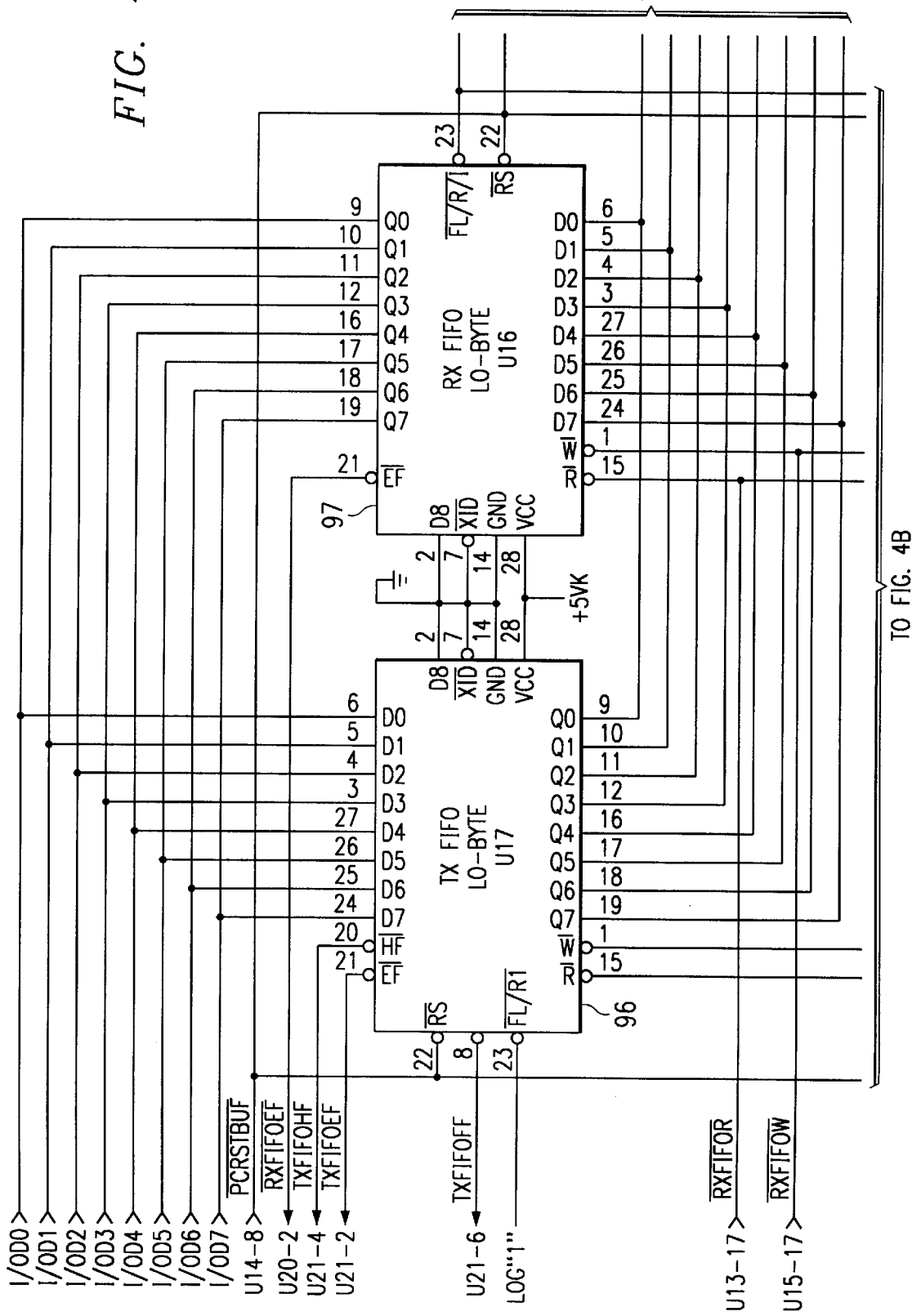
FIG. 4 depicts a portion of a schematic circuit diagram for an interface board according to one aspect of the invention.
Figure 4B:
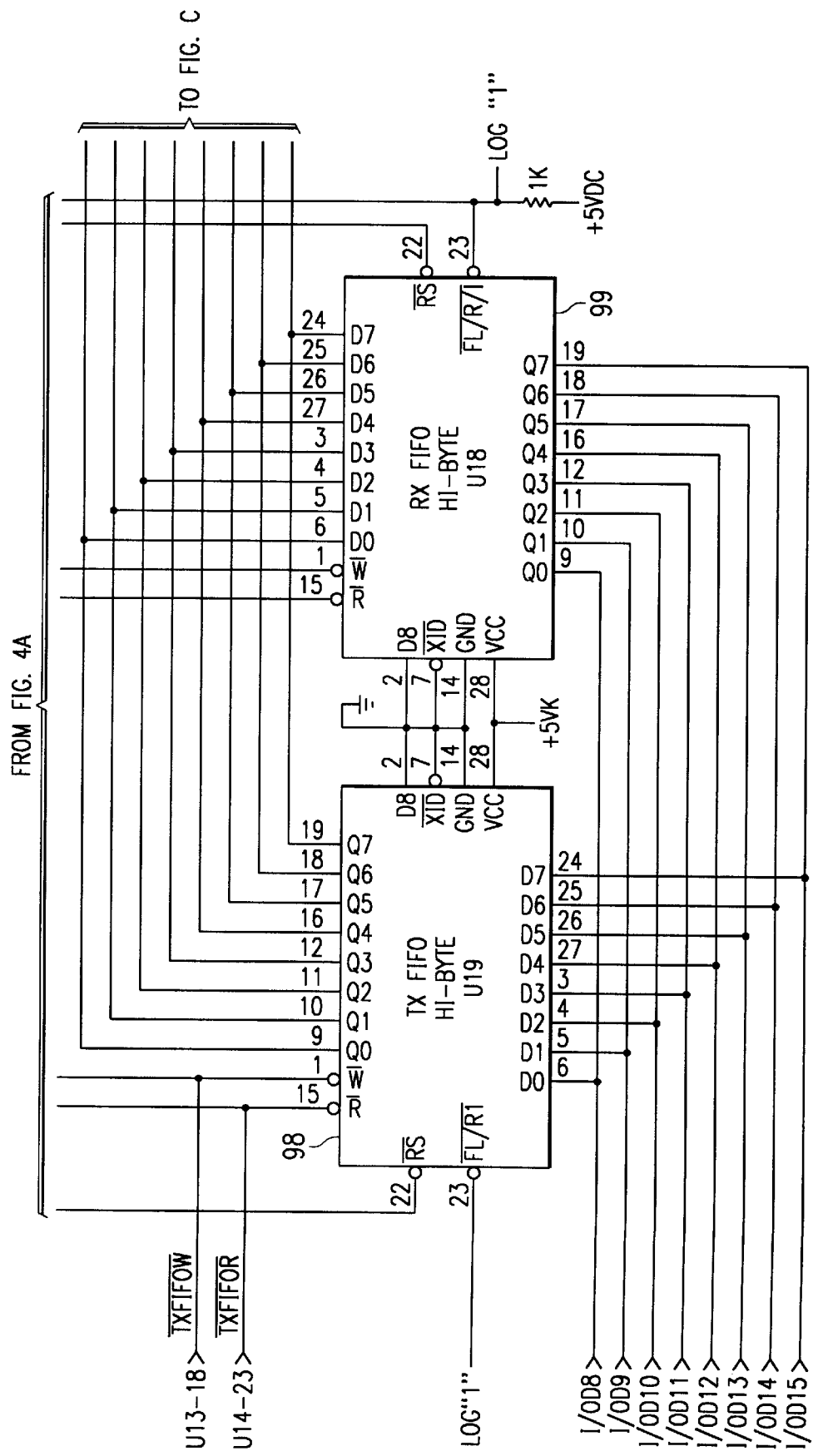
Figure 4C:
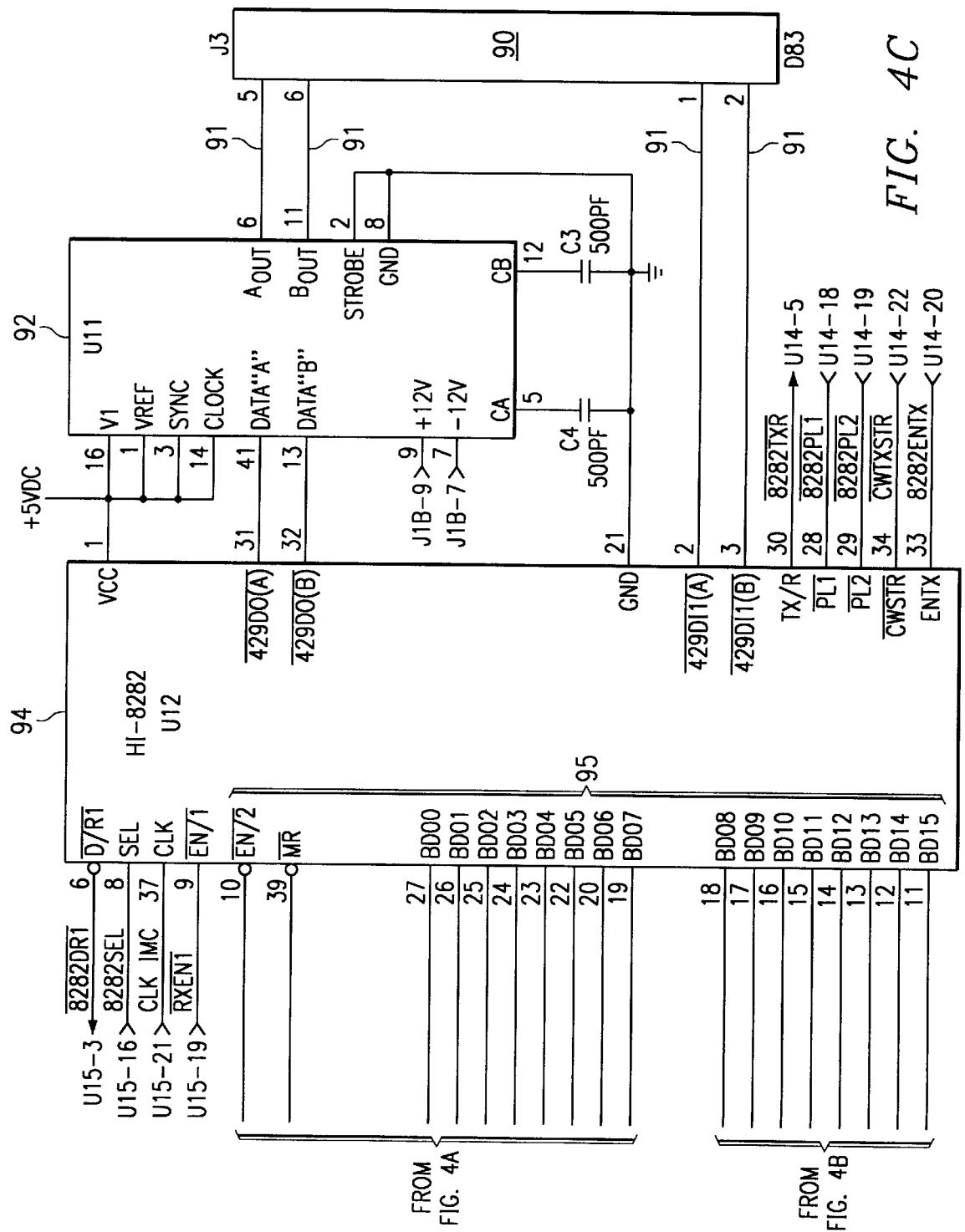
Figure 5A:
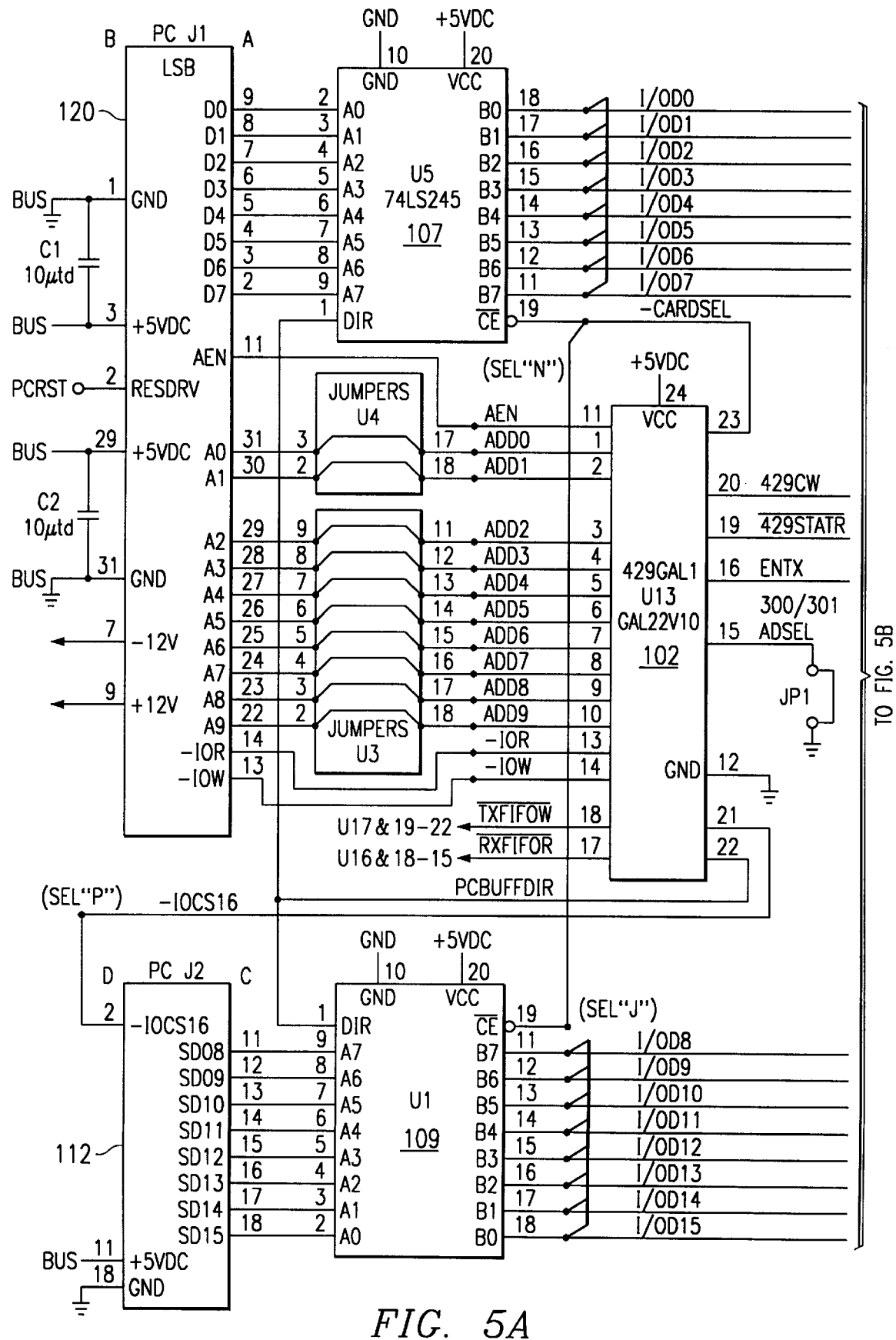
FIG. 5 depicts a schematic circuit diagram that compliments the one shown in FIG. 4.
Figure 5B:
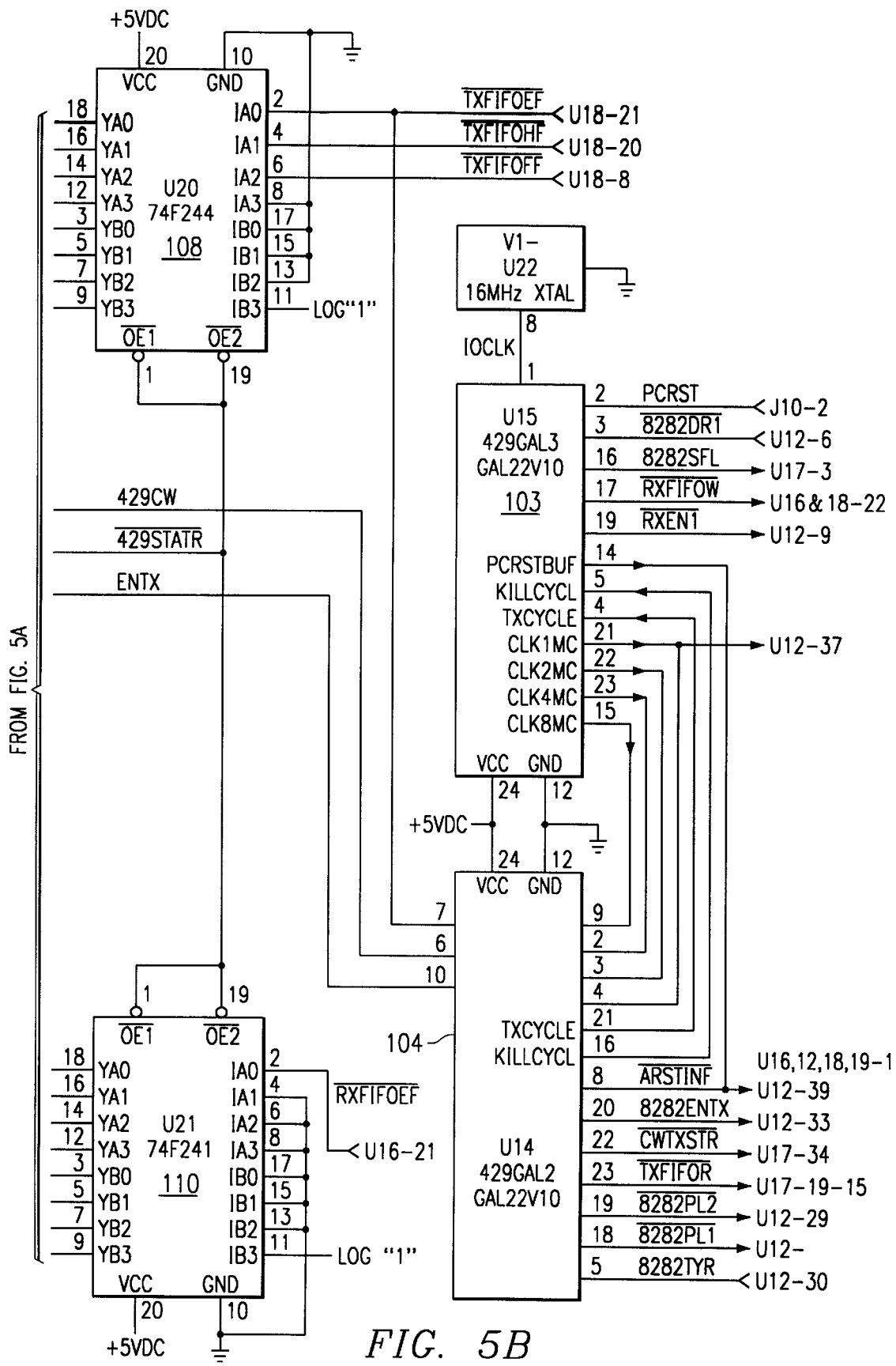

In one embodiment, the interface board 72 comprises a printed circuit board with an ARINC 429 interface to the automated navigational devices 15 and 20 and a standard bus interface to the workstation 70. FIGS. 4 and 5 illustrate one contemplated embodiment of an interface board 72 suitable for this purpose. It should be understood, however, that other board configurations will be apparent to those skilled in the art upon reference to this specification.

Turning first to FIG. 4, a connector 90 provides the physical interface between the automated navigational devices 15 and 20 and workstation 70. The connector 90 is coupled to the transmitter/receiver chips 92 and 94 via signal paths 91. It is the chips 92 and 94 which perform the signal drive functions of the board 72 allowing for bidirectional communications between the workstation 70 and the automated navigational devices 15 and 20. The ARINC 429 differential line driver and serial transmitter/receiver devices from Holt Integrated Circuits, Inc., can be used for chip sets 92 and 94.

As shown, 429 driver chip 94 is coupled to memory circuits 96, 97, 98 and 99 via bus 95. Memory circuits 96, 97, 98 and 99 provide temporary storage areas for the information data flow between the workstation 70 and the automated navigational devices 15 and 20. In one embodiment, the memory circuits 96, 97, 98 and 99 are configured as First-In-First-Out ("FIFO") memory and partitioned to provide equal amounts of transmit and receive space. Thus, in one embodiment two (2) of the memory circuits 97 and 99 are configured as receive FIFOs and the other two (2) 96 and 98 are configured as transmit FIFOs. Other memory configurations may also be used.

FIG. 5 is a schematic circuit diagram for the remainder of the interface board 72 according to one embodiment. Specifically, the receive and transmits memories 96, 97, 98 and 99 are coupled to logic circuits 102, 103 and 104 via a plurality of signal paths as illustrated in the schematic. The logic circuits 102, 103 and 104 are used to control the operation of the various interface board components by controlling the flow of data between the jack 90 and the computer interface 120. In one embodiment, logic circuits 102, 103 and 104 comprise custom logic array circuits that store code segments for performing some of the software functions of the interface board 72.

As shown, bidirectional latches 107, 108, 109 and 110 are coupled to the logic circuits 102, 103 and 104 via a plurality of data/address buses. The latches 107, 108, and 110 provide a way of reading and writing the data to and from the logic circuits 102, 103 and 104 and the computer interface 120. The read/write operation of latches 107 and 109 is controlled in part by select device 112. The other components shown in FIGS. 4 and 5 that control the operation of the interface board 72 are well known to those skilled in the art.

Figure 6:
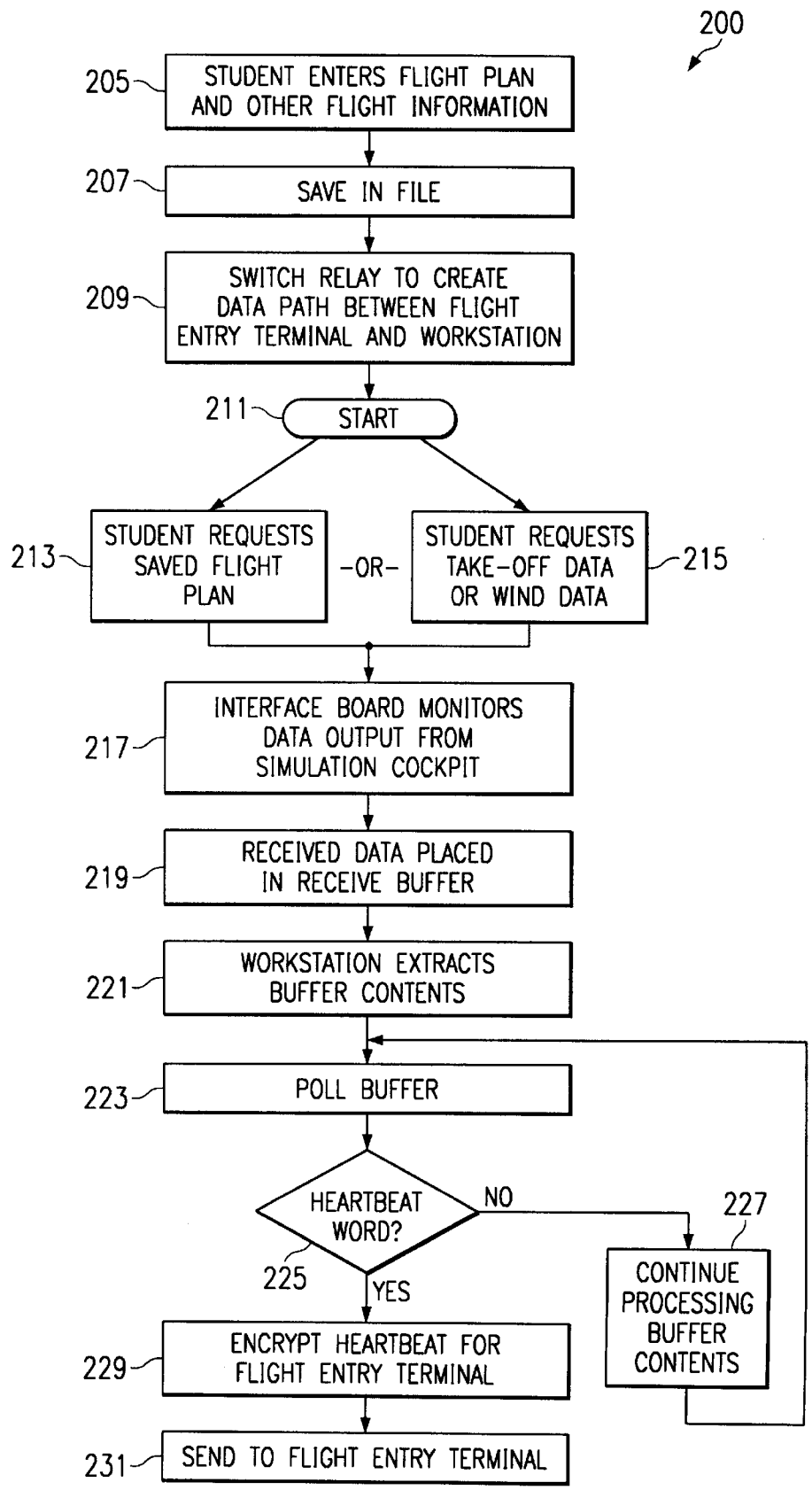
FIG. 6 is a process flow diagram of a process for receiving data from an automated navigational device according to one embodiment of the invention.

Turning now to FIG. 6, the process for entering and selecting a flight plan using the workstation 70 is shown and denoted generally as 200. Process 200 commences when a student enters a flight plan, step 205, and other flight information into the workstations 70 inside the briefing room 80. The flight plan 205 is then converted into an electronic file and saved, step 207, into the workstation's storage device 73. At this point, the frame relay device 54 is operated to create a signal pathway 74 between the interface board 72 in the workstation 70 and the automated navigational devices 15 and 20.

Next, in step 211, the student starts the simulation process by requesting an already saved flight plan, step 213, or requesting other flight related information, step 215, such as the take-off data or wind data. In step 217, the interface board 72 is set to monitor any data output from the simulation cockpit 12. Application programs inside the workstation 70 control the operation of the interface board 72.

In step 219, any data received is placed in the receive buffers of the interface board 72. When the buffers are full, the workstation 70 extracts the buffer contents, step 221, and polls the buffer contents, step 223, in order to determine if a heartbeat word, step 225, has been received. A heartbeat word, as understood by those skilled in the art, provides a triggering signal indicating the start of a flight simulation session. For example, in one embodiment, a "357" or "304" octocode is used as a heartbeat conforming to known ARINC avionics protocols.

Where no heartbeat word is found in the data stream from the automated navigational devices 15 and 20, process flow is directed to step 227 wherein the buffer contents continue to be processed. Where a valid heartbeat word has been received, process is directed to step 229 where a response heartbeat word is encrypted and sent, step 231, to the appropriate automated navigational device 15 or 20.

Figure 7:
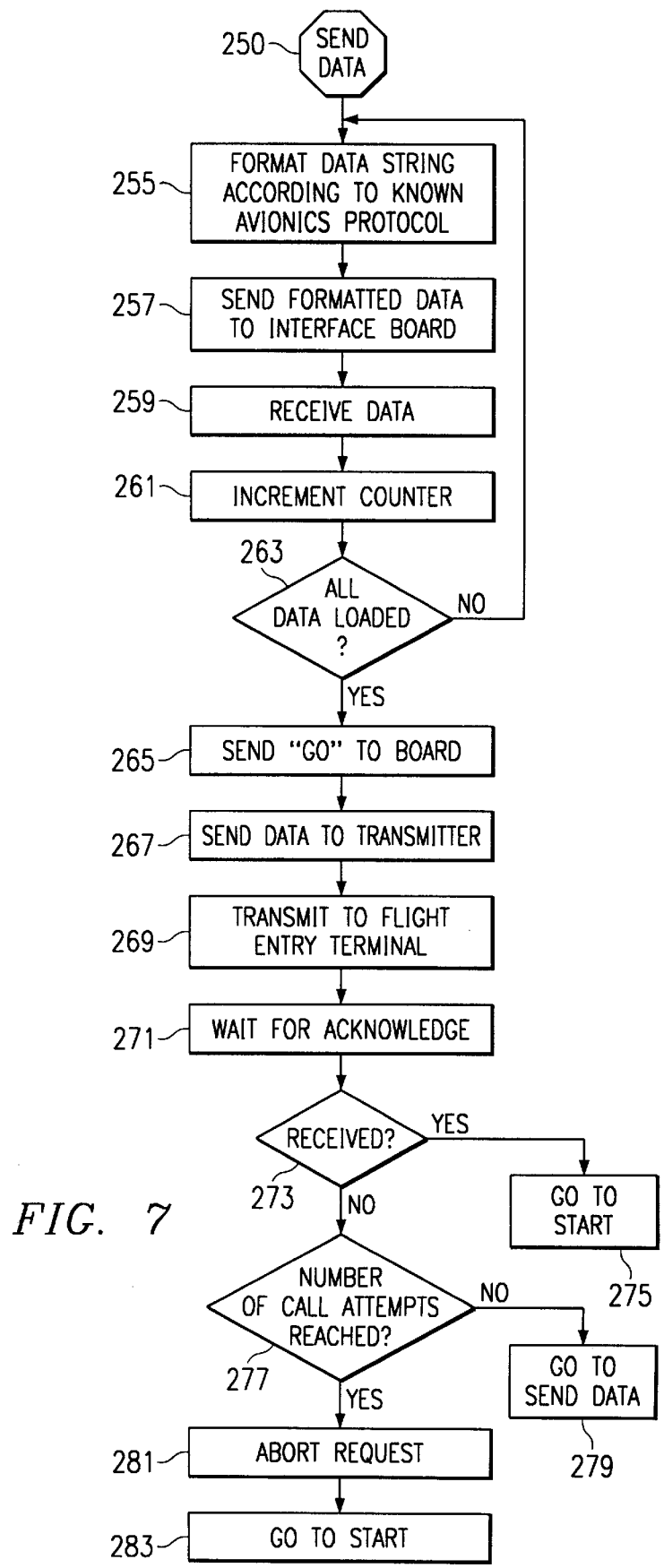
FIG. 7 is a process flow diagram of a process for sending data to an automated navigational device according to one embodiment of the invention.

Turning now to FIG. 7, the process of sending data to the automated navigational devices 15 and 20 is illustrated and denoted generally as 250. The send data process 250 commences when a transmitted data stream is formatted according to known avionics protocols, step 255. As is understood by those skilled in the art, various communications protocols may be used, including the ARINC 429, 454 and 724-B protocols.

The formatted data is sent, step 257, from the workstation 70 to the interface board 72. The interface board 72, in turn, receives the data, step 259, and increments an internal counter, step 261, to keep track of the internal data flow within the board 72 and the availability space within memory devices 96, 97, 98 and 99. Steps 255, 257, 259 and 261 continue until the entire data stream is loaded.

When all the data has been loaded, step 263, process flow is directed to step 265, wherein a "GO" command is sent to the interface board 72. At this point, the formatted data is sent to the interface board's transmitters, step 267, which, in turn, transmit the data to the automated navigational devices, step 269. The interface board 72 waits, step 271, for an acknowledge signal from the automated navigational devices and once received, step 273, process flow is directed to step 275 wherein the student or pilot is allowed to request a saved flight plan or other flight related information.

When no acknowledged signal has been received, step 273, process flow is directed to step 277 wherein the number of call attempts to the automated navigational devices 15 and 20 is calculated. The number of call attempts is a variable which can be programmed or set via the software in the workstation 70 that controls the interface board 72. Where the predetermined number of call attempts has not been reached, step 277, the entire process 250 is repeated, step 279. Otherwise, if the number of predetermined call attempts has been reached, the attempt to send data is aborted, step 281, and the student or pilot is directed to start, step 283, wherein he or she can request a saved flight plan or other flight related information.

Figure 8:
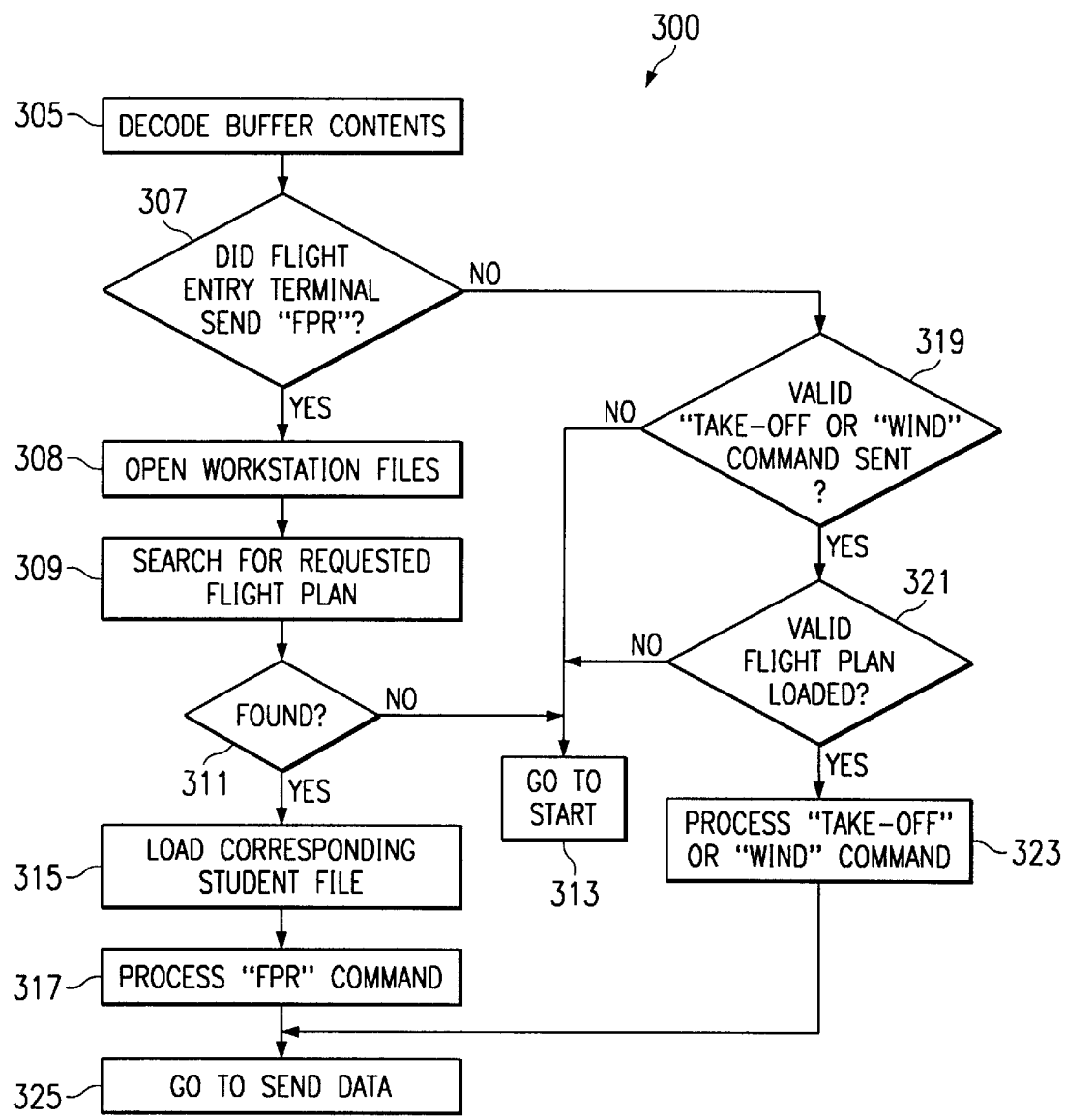
FIG. 8 is a process flow diagram of a process for decoding the data string flow from an automated navigational device according to one embodiment of the invention.

It should be understood that the present invention embraces a method of data transmissions between one or more automated navigational devices 15 and 20 and an interface board 72 inside a workstation 70 to reduce the time the student or pilot spends in the simulation cockpit 12 requesting and loading flight data. In that regard, FIG. 8 illustrates a process 300 for handling the data stream received from the automated navigational devices 15 and 20.

Process 300 starts wherein the buffer contents inside the receive FIFOs 97 and 99 are decoded, step 305, to determine the type of request being transmitted from the automated navigational devices 15 and 20. The interface board 72 is preprogrammed to decode the buffer contents 305 and determine if a valid flight plan request has been sent, step 307.

A plurality of flight data can be transferred between the workstation 70 and the automated navigational devices 15 and 20. In one embodiment, the data stream from the automated navigational devices 15 and 20 to the interface board 72 comprises flight plan requests and/or requests for take-off and wind data.

When a student or pilot sends a request for a flight plan, process flow is directed to step 309 wherein the workstation 70, in response to a valid flight request command, opens a saved workstation file. The workstation file corresponds to one or more flight plans which have been saved by the student or pilot prior to entering the simulation cockpit 12. Thus, the workstation 70 conducts a search for the requested flight plan, step 309, until it is found, step 311.

When no flight plan is found, the student or pilot is directed to step 313, wherein he or she can create a flight plan or request an alternative previously saved flight plan.

When the correct flight is found, process is directed to step 315 where the requested flight plan is loaded into the student's file. In this way, more than one user can utilize the workstation 70 by saving corresponding flight plans into a corresponding file. Next, where a valid flight plan request command has been received, step 317, from the automated navigational devices 15 and 20, the workstation 70 is ready to send data, step 325.

If a valid flight plan request command has not been sent by the automated navigational devices 15 and 20, the data stream is parsed in order to determine if a valid take-off or wind command has been sent, step 319. Here, the workstation 70 determines if a valid flight command has been received and, if not, process flow is directed to step 313 wherein the user is allowed to request a previously saved flight plan. Otherwise, in step 321, the workstation 70 determines if a valid flight plan has already been loaded and, if so, the take-off and wind commands are processed, step 323.

It should be understood that the present invention encompasses a set of software routines and application programs running on the workstation 70 which control the operation and functionality of the interface board 72. While various implementations of such routines and programs may be devised, the following source code listing can be used and implemented by those skilled in the art:

```
/************************************************************************
// file: acarcntl.c
```

```
//      controls the acars 1x1 holt card
//
// note: files that this will read from are acars01.txt thru
acars99.txt
//       : maximum command strings in one file is 20 ie FPRs, LIFs, PWDs,
etc...
//       : maximun character count in one command string is 231 character
//       :
// arinc_init - is the only change in routines to make work with other
card
//**********************************************************************
** include <dos.h>
include <conio.h>
#include <stdio.h>
#include <stdlib.h>
#include <math.h>
#include <fcntl.h>
#include <time.h>

// ***** change because of the new card
#ifndef _429def
  #include "429def.h"
#endif
#ifndef _429proto
 #include "429proto.h"
#endif
            //
            //internal routines
            //
int    arinc_init();
int    get_acars_plan(int acars_plan_number);
int    build_arinc_block(unsigned char *arinc_string1);
void   get_command(void);
void   poll_FMC_command(void);
void   search_for_command(char * command,int buff_cnt);
void   send_arinc_string(unsigned char *arinc_string);
void   decode_FMC_string(void);
void   process_FMC_command(void);
void   search_files_for_requested_flight_plan(char * requested_route);
unsigned long    insert_arinc_data_char(unsigned long dataword,int
charpos,unsigned char chardata);
unsigned char    extract_arinc_data_char(unsigned long dataword,int
charpos);
unsigned short   xmit_arinc_block(unsigned char AWtx[]);
unsigned short   crc16(char *data_p, unsigned short length);
            //
            // globals
            //
```

```
ArincWordType AWtx[77];      // actual arinc word  xmit buff
ArincWordType AWRTStx;       // actual arinc word xmit control wrrd
ArincWordType AWCTSrx;       // actual arinc word rx control buff
ArincWordType AWrx[77];      // actual arinc word rx buff
unsigned char arinc_string[20][255]; //strings to send to FMC  20 string
in que at once
char buff[BUFFSIZE];         // actual file buffer read from disk
int buff_len;                // actual file buffer length
unsigned char FMC_buffer[255];       // command string from FMC ie
FPR..
char command[2];             // command to execute ie 80, 81 etc
unsigned short number_of_arinc_words; // number of arinc words to xfer
to/from
int FMC_waiting_for_plan,ATTEMPT,arinc_string_number,arinc_string_total;
int total_arinc_blocks[2];
int SIM767,SIMA300;
int ARINC429_PRESENT =TRUE;  //init to true  only once
int FIRST_PASS = TRUE;

//**********************
//**********************
//**********************
#ifdef DEBUG
//   int TEST = TRUE;
#endif
//**********************
//**********************
//**********************

//*************************************************************
//  main arinc control routine
//  sample way to call routine
//*************************************************************
int main()
{
  do{
    acarcntl();
  }while(!kbhit());
  return(0);
} int acarcntl()
{
#ifdef DEBUG
    int         flicker,cursor_size;
    static char Flicks[] = "|/-\\|/-\\";
    int xpos,ypos;
#endif
    int status;
    SIM767=TRUE;
```

-25-

```
    SIMA300=FALSE;
    if(!ARINC429_PRESENT) return(FALSE);
    if(FIRST_PASS){
       status = arinc_init();            // initialize the arinc boar
       if(status == FALSE){
#ifdef DEBUG
       printf("**************** ERROR  ************* ERROR
******************\n");
       printf("* ARINC 429 - ARINC board was not setup correctly or
missing! *\n");
       printf("**************** ERROR  ************* ERROR
******************\n");
#endif
       return(status);
       }
       ATTEMPT = 0;                 // attempts to xmit string to FMC
       total_arinc_blocks[0]=0;     // count of FMC blocks sent total per
flight
       total_arinc_blocks[1]=0;     //ie AA AB AC AD...AZ BA BB BC ...ZZ
       FIRST_PASS = FALSE;
    }
#ifdef DEBUG
    flicker = 0;                // tick on the screen
//     clrscr();
#endif
//     while(kbhit() ==0){
#ifdef DEBUG
       xpos=wherex();
       if(xpos >2) printf("\n");
       ypos=wherey();
       gotoxy(1,ypos);
       printf("%c",Flicks[flicker++]);
       if (flicker > 7)    flicker = 0;
#endif
       get_command();
//     }
    return(status);
}

//*********************************************************************
*****
// get command
// input: none
// output: none
//*********************************************************************
******
void get_command(void)
{
//     static long delay_timer;
       static time_t start, now;
       static delay_n_seconds = 10;
```

```
      poll_FMC_command();              //watch FMC port for command request
      if(FMC_waiting_for_plan){        // FMC is wants information from ACARs
         now = time(NULL);
//         delay_timer++;
         if(difftime(now, start) > (double)delay_n_seconds) {
//            if(delay_timer > 20000) {  //wait like the ground station
                                //always xmit arinc_string[0]
            strcpy(arinc_string[0],arinc_string[arinc_string_number]);
            if(total_arinc_blocks[0]<26){
               arinc_string[0][4] = 'A'+ total_arinc_blocks[0]++;  //keep track of total blocks sent to FMC!
            }else{
               total_arinc_blocks[0]=0;
               arinc_string[0][3] = 'B'+ total_arinc_blocks[1]++;  //keep track of total blocks sent to FMC!
            }
            send_arinc_string(arinc_string[0]);
            start = time(NULL);
            now= start;
//            delay_timer=0;
            ATTEMPT++;
            if(ATTEMPT > 5){
#ifdef DEBUG
               printf("\nAfter 5 attempts, I am aborting the request!\n");
#endif
               FMC_waiting_for_plan = FALSE;
               ATTEMPT = 0;
            }
         }
      }else{
         start = time(NULL);
         now= start;
//         delay_timer=0;
      }
}
//**********************************************************************
// poll to see if FMC need to talk to us if so get string
//   get Rx FIFO buffer from FMC if not empty
//**********************************************************************
void poll_FMC_command()
{
    unsigned char data_char;
    unsigned long data_word;
    LabelType label;
    unsigned char ssm;
    ParityType parity;
    STATUS Code = SUCCESS;
```

```c
    unsigned short NumOfElemRecieved;
    int cnt,timer;
    static time_t start1, now1;
    static delay_n_seconds1 = 3;
            //
            //   actuall do the poll of receive buffer
            //
    if((Code=RxFIFO(R0, &AWCTSrx)) == SUCCESS){
#ifdef DEBUG
        PrintArincWord(&AWCTSrx);   //actual arinc word sent from FMC endif
    }
    if (Code != SUCCESS) {  //no RTS From FMC
       return;   //nothing in the Queue from FMC
    }else{
//      PrintArincWord(&AWCTSrx);   //actual arinc word sent from FMC
      DecomposeArincWord(&AWCTSrx,&label,&data_word,&ssm,&parity);
      data_word = data_word +(ssm * 0x200000);
      if(label != 0xEF) return;          // not for acars  label 357 octal
      data_char = extract_arinc_data_char(data_word,2); //get DC2
      if (data_char == DC2Char){ //valid RTS word from FMC
           // get sink status (word count)
      data_char = extract_arinc_data_char(data_word,0); //sink status word cnt
#ifdef DEBUG
      printf("FMC sends (RTS)- '%s' , Request To Send %d words.\n",DC2Display, data_char);

#endif
      number_of_arinc_words = data_char;
            //
            // build CTS word to send to FMC
            //
      ssm =0;
      data_word =0;
      data_word = insert_arinc_data_char(data_word,2,DC3Char);
      data_word = insert_arinc_data_char(data_word,1,NULL); // always for ISO alphabet
      data_word = insert_arinc_data_char(data_word,0,number_of_arinc_words);  //wrd cnt
      ComposeArincWord(&AWRTStx, 0xEF, data_word, ssm); //octal 357
            //
            // xmit CTS to FMC
            //
      if((Code=TxFIFO(T0, &AWRTStx)) != SUCCESS){
#ifdef DEBUG
         PrintStatus(Code);
#endif
```

-28-

```
        }
            //
            // receive FMC string
            //  wait for string from FMC
            //
#ifdef DEBUG
        printf("ACARS sends (CTS)- '%s' ,Clear To Send %d
words.\n",DC3Display,number_of_arinc_words);
#endif
        if(number_of_arinc_words != 0)   //if number = 0 then it must be a
heartbeat request
        {
            cnt=0;          // word count
//          timer =0;    //drop out timer
            start1 = time(NULL);
            now1 = start1;
            do{   //get buffer words
                if((Code=RxFIFO(R0, &AWrx[cnt])) == SUCCESS){
#ifdef DEBUG
                    PrintArincWord(&AWrx[cnt]);
#endif
                    cnt ++;
            }else{          //buffer empty
                   now1 = time(NULL);
//               timer++;
                }
//          }while ((cnt < number_of_arinc_words) && (timer < 10000));
            }while ((cnt < number_of_arinc_words) &&
                    (difftime(now1, start1) < (double)delay_n_seconds1));

if(number_of_arinc_words != cnt){
                ssm =0;                     //not a good transmission
                data_word =0;               //must have missed some words!
                data_word = insert_arinc_data_char(data_word,2,NAKChar);
                data_word = insert_arinc_data_char(data_word,1,SOHChar); //
equipment ID
                data_word = insert_arinc_data_char(data_word,0,STXChar);
//wrd cnt
                ComposeArincWord(&AWRTStx, 0xEF, data_word, ssm); //octal
357
                if((Code=TxFIFO(T0, &AWRTStx)) != SUCCESS){
#ifdef DEBUG
                    PrintStatus(Code);
#endif
                }
#ifdef DEBUG
                printf("ACARS sends (NAK)- '%s' ,Not ACK - Transmission was
BAD!\n",NAKDisplay);
#endif
                return;
            }else{              //send acknowledge
```

-29-

```
            ssm =0;
            data_word =0;
            data_word = insert_arinc_data_char(data_word,2,ACKChar);
            data_word = insert_arinc_data_char(data_word,1,SOHChar); //
set bit 17
            data_word =
insert_arinc_data_char(data_word,0,number_of_arinc_words);  //wrd cnt
            ComposeArincWord(&AWRTStx, 0xEF, data_word, ssm); //octal
357
            if((Code=TxFIFO(T0, &AWRTStx)) != SUCCESS){
#ifdef DEBUG
                PrintStatus(Code);
#endif
            }
#ifdef DEBUG
            printf("ACARS sends (ACK)- '%s' Acknowledge - Transmission
was OK!\n",ACKDisplay);
#endif
        }
        decode_FMC_string();
        process_FMC_command();
      } //end of if fmc sent a NULL word count
      }//end of if valid DC2
    }
} // end of function
//******************************************************************
// decode arinc string from FMC
//
//******************************************************************
void decode_FMC_string()
{
    int i,x;
    unsigned char data_char;
    unsigned long data_word;
    LabelType label;
    unsigned char ssm;
    ParityType parity;

memset(FMC_buffer,0,255);
      x=0;
            // stuff arinc stuff into FMC read buffer
        for(i=0; i<number_of_arinc_words ;i++){
          DecomposeArincWord(&AWrx[i],&label,&data_word,&ssm,&parity);
          data_word = data_word +(ssm * 0x200000);
          data_char = extract_arinc_data_char(data_word,0); //get pos 0
char
          FMC_buffer[x++] =data_char;
          data_char = extract_arinc_data_char(data_word,1); //get pos 1
char
          FMC_buffer[x++] =data_char;
          data_char = extract_arinc_data_char(data_word,2); //get pos 2
```

```c
char
        FMC_buffer[x++] =data_char;
      }
   FMC_buffer[x] = '/0';    //make it a legal string
#ifdef DEBUG
   printf("Raw command from FMC:\n%s\n",FMC_buffer);
#endif
   return;
}
//**********************************************************************
****
// process FMC command
//
//**********************************************************************
****
void process_FMC_command(void)
{ unsigned short CRC_value;
   int string_len,tmp_string_len;
   char arinc_string_tmp[255];
   unsigned short tmp_len;
   unsigned char crc_1[2],crc_2[2],crc_3[2],crc_4[2];
   int i;
   char requested_route[11];
   char requested_rwy[4];
   char requested_wind[11];

memset(requested_route,0,11);
   memset(requested_rwy,0,4);
   memset(requested_wind,0,11);
            // check for valid command
   if((FMC_buffer[2] != STXChar) || (FMC_buffer[0] !=
number_of_arinc_words))
        return;   // not a valid command string from FMC
            //from FMC?
   if ((FMC_buffer[19] == 'M') && (FMC_buffer[20]== '1')){
      if((FMC_buffer[22] =='F') && (FMC_buffer[23]=='P') &&
        (FMC_buffer[24] =='R') && (FMC_buffer[26]=='C') &&
        (FMC_buffer[27] =='R')){
        for(i=0;i<10;i++)
           requested_route[i] = FMC_buffer[28+i];   //28 - 37
#ifdef DEBUG
        printf("Requested Route from FMC is '%s'.\n",requested_route);
#endif
        search_files_for_requested_flight_plan(requested_route);
            //execute command
        strcpy(command,"80");
        if(buff_len>0){   //plan in buffer?
           search_for_command(&command[0],buff_len);
```

-31-

```c
        }else{
#ifdef DEBUG
        printf("ERROR:   No flight plan loaded yet!\n");
        printf("         Please issue from FMC a plan request from the
ACARS page\n");
        printf("         (ie.KDFWDORD01)  or issue command from
instructor station!\n");
#endif
        }
        strcpy(command,"");  //zero out command
        } //end of route if if(SIMA300){
        if((FMC_buffer[22] =='L') &&(FMC_buffer[23]=='I') &&
        (FMC_buffer[24] =='F') &&(FMC_buffer[26]=='R') &&
        (FMC_buffer[27] =='D')){
        for(i=0;i<3;i++)
            requested_rwy[i] = FMC_buffer[28+i];
#ifdef DEBUG
        printf("Requested Runway from FMC is '%s'.\n",requested_rwy);
#endif
            //execute command
        strcpy(command,"81");
        if(buff_len>0){  //plan in buffer?
            search_for_command(&command[0],buff_len);
        }else{
#ifdef DEBUG
        printf("ERROR:   No flight plan loaded yet!\n");
        printf("         Please issue from FMC a plan request from the
ACARS page\n");
        printf("         (ie.KDFWDORD01)  or issue command from
instructor station!\n");
#endif
        }
        strcpy(command,"");  //zero out command
        } //end of runway if
        } //if A300 end
        if(SIM767){
        if((FMC_buffer[22] =='L') &&(FMC_buffer[23]=='I') &&
        (FMC_buffer[24] =='F') &&(FMC_buffer[33]=='R') &&
        (FMC_buffer[34] =='D')){
        for(i=0;i<3;i++)
            requested_rwy[i] = FMC_buffer[35+i];
#ifdef DEBUG
        printf("Requested Runway from FMC is '%s'.\n",requested_rwy);
#endif
            //execute command
        strcpy(command,"81");
        if(buff_len>0){  //plan in buffer?
            search_for_command(&command[0],buff_len);
        }else{
```

-32-

```
#ifdef DEBUG
        printf("ERROR:    No flight plan loaded yet!\n");
        printf("          Please issue from FMC a plan request from the
ACARS page\n");
        printf("          (ie.KDFWDORD01)  or issue command from
instructor station!\n");
#endif
        }
      strcpy(command,"");  //zero out command
      } //end of runway if
    } //end of if 767 runway
    if((FMC_buffer[22] =='P') &&(FMC_buffer[23]=='W') &&
     (FMC_buffer[24] =='D')){
     for(i=0;i<3;i++)
        requested_wind[7+i] = FMC_buffer[26+i];
     if(FMC_buffer[25] == 'P'){
       requested_wind[0]=' ';
       requested_wind[1]=' ';
       requested_wind[2]='P';
       requested_wind[3]='L';
       requested_wind[4]='A';
       requested_wind[5]='N';
       requested_wind[6]=' ';
     }else{
       requested_wind[0]='C';
       requested_wind[1]='H';
       requested_wind[2]='A';
       requested_wind[3]='N';
       requested_wind[4]='G';
       requested_wind[5]='E';
       requested_wind[6]=' ';
     } // end of plan or change
#ifdef DEBUG
     printf("Requested Wind from FMC is '%s'.\n",requested_wind);
#endif
          //execute command
      strcpy(command,"82");
      if(buff_len>0){  //plan in buffer?
         search_for_command(&command[0],buff_len);
      }else{
#ifdef DEBUG
        printf("ERROR:    No flight plan loaded yet!\n");
        printf("          Please issue from FMC a plan request from the
ACARS page\n");
        printf("          (ie.KDFWDORD01)  or issue command from
instructor station!\n");
#endif
      }
      strcpy(command,"");  //zero out command
    } //end of PWD if
  }else{      // end of FMC if
```

```c
        if((FMC_buffer[4] =='A') &&(FMC_buffer[5]=='D') &&
         (FMC_buffer[6] =='M') &&(FMC_buffer[7]=='@')){
            strcpy(arinc_string[1],"MDA@AA0000"); //response?
            strcpy(arinc_string_tmp,arinc_string[1]);
            tmp_len = strlen(arinc_string_tmp);
            CRC_value =crc16(arinc_string_tmp, tmp_len);
            strupr(itoa((CRC_value >> 12),crc_1,16));
            strupr(itoa(((CRC_value >> 8) & 0x000F),crc_2,16));
            strupr(itoa(((CRC_value >> 4) & 0x000F),crc_3,16));
            strupr(itoa((CRC_value  & 0x000F),crc_4,16));
            strcpy(arinc_string_tmp,"");  //arinc_string[1]);
            strcat(arinc_string_tmp,crc_1);
            strcat(arinc_string_tmp,crc_2);
            strcat(arinc_string_tmp,crc_3);
            strcat(arinc_string_tmp,crc_4);
            tmp_len = strlen(arinc_string[1]);
            strcpy(arinc_string[1],"XMDA@AA0000");
            arinc_string[1][0] = USChar;
            strcat(arinc_string[1],arinc_string_tmp);
            tmp_len = strlen(arinc_string[1]);
            arinc_string[1][tmp_len]=ETXChar;
            arinc_string[1][tmp_len+1]='\0';  //null strcpy(arinc_string[0],arinc_string[1]);
            send_arinc_string(arinc_string[0]);
            total_arinc_blocks[0] = 0;   //reset block counter to 0
            total_arinc_blocks[1] = 0;
        }
    }
return;
} // end of function
//*************************************************************
// search for command then xmit string to FMC
// input: acars plan number
// output: number of characters in file
//*************************************************************
void search_for_command(char *command,int buff_len)
{
    unsigned short CRC_value;
    int x,x1,string_len,tmp_string_len;
    char arinc_string_tmp[255];
    unsigned short tmp_len;
    unsigned char crc_1[2],crc_2[2],crc_3[2],crc_4[2];
    char *p,*tmp_p;

arinc_string_total= 0;
      arinc_string_number=1;
      do{
        if(buff[x]=='!'){
            p=&buff[x];
            do{
```

```
            x++;
            p++;
        }while(*p != LF && x<buff_len);
        p++;
    }
    if(buff[x]=='@'){
        p=&buff[x];
        for(x1 = 1; x1 < 11 ; x1 += 2){ //search command string
        if(memcmp(p+x1,command,strlen(command))==0){
            memset (arinc_string[0], 0, 255);
            tmp_p=p=&buff[x]+12;
            string_len=0;
            while(*tmp_p != '!'){
              tmp_string_len = 0;
              do{
                tmp_string_len++;
                string_len++;
                tmp_p++;
                if(*tmp_p == LF){
                string_len++;
                }
              }while(*tmp_p != LF);
            strncat(arinc_string[0],p,tmp_string_len);
            tmp_p = p= p + tmp_string_len + 1;

}
// build header for string strcpy(arinc_string_tmp,arinc_string[0]);
            tmp_len = strlen(arinc_string_tmp);

CRC_value =crc16(arinc_string_tmp, tmp_len);
// now convert to asc and append to message
            strupr(itoa((CRC_value >> 12),crc_1,16));
            strupr(itoa(((CRC_value >> 8) & 0x000F),crc_2,16));
            strupr(itoa(((CRC_value >> 4) & 0x000F),crc_3,16));
            strupr(itoa((CRC_value  & 0x000F),crc_4,16));
            strcpy(arinc_string_tmp,arinc_string[0]);
            strcat(arinc_string_tmp,crc_1);
            strcat(arinc_string_tmp,crc_2);
            strcat(arinc_string_tmp,crc_3);
            strcat(arinc_string_tmp,crc_4);
            tmp_len = strlen(arinc_string[0]);

strcpy(arinc_string[0],"XVVAA- #MD");
            arinc_string[0][0] = USChar;

strcat(arinc_string[0],arinc_string_tmp);
            tmp_len = strlen(arinc_string[0]);
            arinc_string[0][tmp_len]=ETXChar;
```

```
                    arinc_string[0][tmp_len+1]='\0';  //null
                    FMC_waiting_for_plan = TRUE;
                    ATTEMPT = 0;
                    arinc_string_total++;
                    strcpy(arinc_string[arinc_string_total],arinc_string[0]);
                     x1=11; // get out of this loop
                     x=x+11+string_len;//inc pointer
                  }
                 }
             }
        x++;
        }while(x<buff_len);
}
//***************************************************************
// xmit string to FMC
// input: acars plan number
// output: number of characters in file
//***************************************************************
int get_acars_plan(int acars_plan_number)
{ char txt_file[11],number[5];
    int inhandle,bytes,x;

strcpy (txt_file,"ACARS");
    itoa(acars_plan_number,number,10);
    if(acars_plan_number < 10)  strcat(txt_file,"0");  // lesson plan
number
    strcat(txt_file,number);  // lesson plan number
    strcat (txt_file,".TXT");

if((inhandle = open(txt_file,O_RDONLY)) < 0){
#ifdef DEBUG
        printf("ERROR   Can't open file: %s\n",txt_file);
        printf("\n<any key to continue>\n");
        getch();
#endif
        buff_len=0;
        return(0);  //error occured  error number
    }
//read in file
    buff_len =0;
    while ((bytes = read(inhandle,buff,BUFFSIZE)) > 0)
    // display buffer
       for(x=0;x <bytes;x++){
         //print buffer and count bytes
         buff_len++;
         }
    close(inhandle);
#ifdef DEBUG
    printf("Total number of bytes read from file %s is
```

```c
%d\n",txt_file,buff_len);
#endif
    return(buff_len);
}
//****************************************************************
// xmit string to FMC
//**************************************************************** void send_arinc_string(unsigned char *arinc_string)
{
    unsigned long x;
    char ch;
    int FMC_waiting_for_data = FALSE;
    int i,attempt;
    unsigned short NumOfElemTransmitted;
    unsigned char data_char;
    unsigned long data_word;
    LabelType label;
    unsigned char ssm;
    ParityType parity;
    STATUS Code = SUCCESS;
    static time_t start2, now2;
    static delay_n_seconds2 = 10;
    static time_t start3, now3;
    static delay_n_seconds3 = 3;
    int finished, finished3;

number_of_arinc_words = build_arinc_block(arinc_string);

attempt = 0;
 while(attempt < 3 && !FMC_waiting_for_data){
            //
            // first need to send a RTS to FMC from ACARS
            // send RTS to FMC
            //
    if((Code=TxFIFO(T0, &AWRTStx)) != SUCCESS){
#ifdef DEBUG
        PrintStatus(Code);
#endif
    }
    DecomposeArincWord(&AWRTStx,&label,&data_word,&ssm,&parity);
    data_word = data_word +(ssm * 0x200000);
            // get number of arinc words
    data_char = extract_arinc_data_char(data_word,0);
#ifdef DEBUG
    printf("Acars sends RTS - '%s' ,(word cnt:
%d)\n",DC2Display,data_char);
#endif
            // wait for CTS from FMC
            // wait(200ms) to recieve arinc word from FMC octal label
```

```
357 only (CTS)
        start2 = time(NULL);
        now2= start2;
        finished = FALSE;
//      x=0;
//      while (x < 50000) {
        while(difftime(now2, start2) < (double)delay_n_seconds2 &&
!finished) {
            if((Code=RxFIFO(R0, &AWCTSrx)) == SUCCESS){
#ifdef DEBUG
            PrintArincWord(&AWCTSrx);
#endif
                finished = TRUE;
//              x=50000;
            }
            else{  //wait more
             now2 = time(NULL);
//              x++;
            }
        } //end of while
        if (Code != SUCCESS) {  //no CTS returned
#ifdef DEBUG
            PrintStatus(Code);
            printf("No CTS sent from FMC - needed a - '%s'\n",DC3Display);
#endif
            attempt++;
        }else{
          DecomposeArincWord(&AWCTSrx,&label,&data_word,&ssm,&parity);
          data_word = data_word +(ssm * 0x200000);
          data_char = extract_arinc_data_char(data_word,2); //get DC3
#ifdef DEBUG
        printf("FMC responds with CTS: %d - '%s',
",data_char,DC3Display);
#endif
        if (data_char == DC3Char){ //valid CTS word
               // get sink status
        data_char = extract_arinc_data_char(data_word,0); //sink status
#ifdef DEBUG
        printf("Status:(wrd cnt) %d \n",data_char);
#endif
        if (data_char ==  number_of_arinc_words){
           FMC_waiting_for_data = TRUE;
        }else{
          switch (data_char){
             case 'Q':
#ifdef DEBUG
                   printf("Destination device busy (FMC)'Q5'\n");
                   printf("Please wait 15 seconds before trying
again!\n");
#endif
                   FMC_waiting_for_data = FALSE;
```

```
                            attempt = 3;    //quit this loop must wait 15 sec and
try again
                            break;
                  case NULL:
#ifdef DEBUG
                            printf("FMC not ready to accept data\n");
#endif
                            delay(200);   //wait 200 ms
                            attempt++;       // try to send again
                            if(attempt >=3 ){
#ifdef DEBUG
                               printf("Destination device busy (FMC)'Q5'\n");
                               printf("Please wait 15 seconds before trying
again!\n");
#endif
                               FMC_waiting_for_data = FALSE;
                            }
                            break;
                  default:
#ifdef DEBUG
                            printf("FMC not ready to accept data\n");
#endif
                            delay(200);   //wait 200 ms
                            attempt++;       // try to send again
                            if(attempt >=3 ){
#ifdef DEBUG
                               printf("Destination device busy (FMC)'Q5'\n");
                               printf("Please wait 15 seconds before trying
again!\n");
#endif
                               FMC_waiting_for_data = FALSE;
                            }
                            break;

} //end of switch
       } //end of arinc word  if
      }else{
#ifdef DEBUG
       printf("Invalid CTS word, no DC3 character!\n");
#endif
      } // end of DC3 else
    } // end of no CTS sent
 } //end of attempt while
 if(FMC_waiting_for_data){
                  // transmit FIFo block of Arinc words to FMC
       NumOfElemTransmitted = xmit_arinc_block(AWtx);
       if(NumOfElemTransmitted !=  number_of_arinc_words){
#ifdef DEBUG
         printf("Not all transmitted, need to try again\n");
#endif
       }
```

-39-

```
#ifdef DEBUG
      printf("ACARS sends string to FMC:\n%s\n",arinc_string);
#endif
 }

// wait for either ACK or NAK
   start3 = time(NULL);
   now3= start3;
   finished3 = FALSE;
//x=0;
// while(x<15000){   //should be 100 ms
   while(difftime(now3, start3) < (double)delay_n_seconds3 &&
!finished3){   //should be 100 ms
     if((Code=RxFIFO(R0, &AWCTSrx)) == SUCCESS){
#ifdef DEBUG
       printf("Acknowledge word recieved from FMC: -'%s' \n",ACKDisplay);
       PrintArincWord(&AWCTSrx);
#endif
       finished3 = TRUE;
//         x=15000;
     }else{   //wait more
       now3 = time(NULL);
//         x++;
     }
 } //end of while if (Code != SUCCESS) {   //no ACK or NAK returned
ifdef DEBUG
     PrintStatus(Code);
     printf("No ACK or NAK sent from FMC\n");
#endif
 }else{
     DecomposeArincWord(&AWCTSrx,&label,&data_word,&ssm,&parity);
     data_word = data_word +(ssm * 0x200000);
     data_char = extract_arinc_data_char(data_word,2); //get ACK or NAK
#ifdef DEBUG
     printf("FMC sends - Data Recieved Char (6 is ACK)/(21 is NAK) :
%d\n",data_char);
#endif
     if (data_char == ACKChar){ //transmission successful
#ifdef DEBUG
        printf("Transmission succesful!\n");
#endif
        if(arinc_string_number < arinc_string_total){
           arinc_string_number++;   // inc string count
//            delay_timer = 0;        //start timer again
        }else{
           FMC_waiting_for_plan = FALSE;
        }
     }
     if (data_char == NAKChar){ //transmission unsuccessful
```

-40-

```
#ifdef DEBUG
        printf("Transmission NOT succesful!\n");
#endif
      }
  }
} //end of function //*******************************
// arinc board initialize
//*******************************
int arinc_init()
{
    int self_test  =1;                           //bd05
    int rx1_enable =0; // 1 = enable             //bd06
    int rx1_sdi1   =0;                           //bd07
    int rx1_sdi2   =0;                           //bd08
    int rx2_enable =0;                           //bd09
    int rx2_sdi1   =0;                           //bd10
    int rx2_sdi2   =0;                           //bd11
    int tx_parity  =0; //0 = odd                 //bd12
    int tx_speed   =1;  // 1 = lo 0 = hi speed   //bd13
    int rx_speed   =1;                           //bd14
    unsigned int control_word;

int status;
    unsigned int setup_word;
    status=FALSE;
    ARINC429_PRESENT = IsArincBoardPresent();
    if(ARINC429_PRESENT)
    {
      control_word=Compose_Control_Word(self_test,rx1_enable,rx1_sdi1,rx1_sdi2,
                                  rx2_enable,rx2_sdi1,rx2_sdi2,tx_parity,
                                  tx_speed,rx_speed);
       status = InitializeArinc(control_word);
      }else{
       status= FALSE;
      }
       return(status);
}

//*******************************
// transamit block of words through arinc board
// input: first word of buffer to xmit, number of words to xmit
// output: actual number of words xmitted
//*******************************
unsigned short xmit_arinc_block(unsigned char TW[])
{
    int x;
    unsigned short NumOfElemTransmitted;
    STATUS Code = SUCCESS;
```

-41-

```
                    /* block transmission */
//  TX chann, array of arinc labels and data, number of ARINC words in
array,
//       number of arinc words actually transmitted
       if((Code=TxFIFO_Block(T0, TW, (unsigned
short)number_of_arinc_words, &NumOfElemTransmitted)) != SUCCESS){
#ifdef DEBUG
          PrintStatus(Code);
#endif
       }
       if(NumOfElemTransmitted !=  number_of_arinc_words){
#ifdef DEBUG
         printf("not all transmitted, need to try again\n");
#endif
       }
                   /* block transmission */
//       TimeDelay(5);
         return(NumOfElemTransmitted);
}

//****************************************************
// build arinc block max 77 arinc words
//
//****************************************************
int build_arinc_block(unsigned char *arinc_string)
{
  static int x,x1;
  int x2;
  int charpos;
  unsigned char chardata;
  long dataword;
  unsigned char ssm = 0;
  size_t arinc_string_length;

arinc_string_length = strlen(arinc_string);
  if(arinc_string_length >231) {
#ifdef DEBUG
     printf("ERROR to many characters in string max = 231 !\n");
#endif
     return(0);
  }
  x =0;
  x2=1;
  while((x < arinc_string_length) && (x2 < 77)){ //77 is max word count
    dataword =0;
    for(x1=0; x1 < 3; x1++){     //3 characters per word
      chardata = arinc_string[x];
      if(x >= arinc_string_length){
        chardata = NULL;
      }
      charpos = x1;
```

-42-

```
        dataword = insert_arinc_data_char(dataword,charpos,chardata);
        x++;
      }
//    AWtx = pointer to composed arinc word
//    ARINC label
//    ARINC data
//    ARINC SSM sign satus matrix
      ComposeArincWord(AWtx+x2, 0xEF, dataword, ssm); //octal 357
      x2++;
   }
// build Initialization word
   // set up init word 1st word in block
   // STX char in pos 2 and BNR wrd cnt in pos 0
//  dataword =128;  // bit 17 set to 1
   dataword =0;  // bit 17 set to 1
   dataword = insert_arinc_data_char(dataword,2,STXChar);
   dataword = insert_arinc_data_char(dataword,1,SOHChar);
   dataword = insert_arinc_data_char(dataword,0,x2);
   ComposeArincWord(AWtx, 0xEF, dataword, ssm); //octal 357

// build RTS word
   dataword =0;
   dataword = insert_arinc_data_char(dataword,2,DC2Char);
   dataword = insert_arinc_data_char(dataword,1,'A'); // equipment ID
   dataword = insert_arinc_data_char(dataword,0,x2);   //wrd cnt
   ComposeArincWord(&AWRTStx, 0xEF, dataword, ssm); //octal 357
   return(x2);   // retrun number of word to xmit this block
}

//*****************************************
// routine: insert_arinc_data_word
//
// 1) send current data word
// 2) position of char to insert reading backwards
//    example arinc word
//  32 --- ---- -- ------ 1
//  bits 9 -15 = position 0   16 is pad 0
//  bits 17 -23 = position 1 - 24 is pad
//  bits 25 - 31 = positino 2   32 is parity
//  this is ISo alphabet standard
//  ie send ALPHA char pos 0 = A, pos 1 = L, pos 2 = P
//  next word would be pos 0 = H pos 1 = A pos 2 = 0
// 3) send the character to insert
// returns the current data word (long)with the inserted character
//***************************************** unsigned long insert_arinc_data_char(unsigned long dataword,int
charpos,unsigned char chardata)
{
 unsigned long shift;
 unsigned long saved_dataword,temp_dataword;
```

```
    shift = charpos * 8; // compute shift value
    saved_dataword =dataword; //save current word
    dataword=0;
    temp_dataword = (unsigned long)chardata;
    if(charpos == 0)
      dataword = temp_dataword & mask0;   //0x07f; // only 1st 7 bits
    if(charpos ==1)
     dataword = (temp_dataword << shift) & mask1;   //0x03F80;
    if(charpos ==2)
     dataword = (temp_dataword << shift) & mask2;   //0x01FC000;
    dataword = dataword | saved_dataword;
    return (dataword);
}
//*****************************************
// extract arinc char
//***************************************** unsigned char extract_arinc_data_char(unsigned long dataword,int
charpos)
{
 unsigned long shift;
 unsigned char data_char;

shift = charpos * 8; // compute shift value
 if(charpos == 0)
   data_char = dataword & mask0;   //0x07f; // only 1st 7 bits
 if(charpos ==1)
  data_char = (dataword >>shift) & mask0;   //0x03F80;
 if(charpos ==2)
  data_char = (dataword >> shift) & mask0;   //0x01FC000;
 return (data_char);

}
//*****************************************
// load correct flight plan if fpr is found
//*****************************************
void  search_files_for_requested_flight_plan(char * requested_route)
{
    char txt_file[11],number[5],tmp_string[11];
    int inhandle,bytes,x,file_found,i;
    char *p;

file_found = FALSE;
#ifdef DEBUG
    printf("Searching files for requested plan '%s'\n",requested_route);
#endif
    i=1;  //start with flight plan 1 'acars01.txt'
    do{
      memset(buff,0,BUFFSIZE);                        //clear out
buffer
      strcpy (txt_file,"ACARS");
```

-44-

```
      if(i < 10)  strcat(txt_file,"0");  // flight plan number
      itoa(i,number,10);
      strcat(txt_file,number);                       // FLIGHT plan
number
      strcat (txt_file,".TXT");
      if((inhandle = open(txt_file,O_RDONLY)) >= 0){  // any file
found
          buff_len =0;                              //read in file
          while ((bytes = read(inhandle,buff,BUFFSIZE)) > 0)
             for(x=0;x <bytes;x++){
                buff_len++;                         //count file
length
          }
          close(inhandle);
          x=0;
          do{
             if(buff[x]=='!'){  //a remark line - skip this
                p=&buff[x];
                do{
                   x++;
                   p++;
                }while(*p != LF && x<buff_len);
                p++;
             }
             if(buff[x]=='@'){          // is this a command line?
                p=&buff[x]+18;          //set pointer to correct
location for FPR
                strcpy(tmp_string,"");  //empty out string
                strncat(tmp_string,p,10);
                if(stricmp(tmp_string,requested_route) == 0){ // yes
                   x=buff_len;  //set flag to exit search
                   file_found  = TRUE;
                }
             }
             x++;
          }while(x<buff_len);
       }else{
         buff_len=0;//if any file found
       }
       i++;
    }while(!file_found && i< 100);
    if(file_found){
#ifdef DEBUG
    printf("Total number of bytes read from file '%s' is
%d\n",txt_file,buff_len);
    printf("WAITING 15 Seconds...\n");
#endif
    FMC_waiting_for_plan = TRUE;
    ATTEMPT = 0;
    }else{
#ifdef DEBUG
```

-45-

```c
        printf("Flight plan '%s' could not be found!\n",requested_route);
        printf("I searched files ACARS01.TXT thru ACARS99.TXT.\n");
#endif
        FMC_waiting_for_plan = FALSE;
        ATTEMPT = 0;
        buff_len=0;
      }
      return;
}

//*****************************************
// calculate CRC value of message block to FMC
//***************************************** unsigned short crc16(char *data_p, unsigned short length)
{
        unsigned char i;
        unsigned int data;
        unsigned int crc = 0xffff;

if (length == 0)
            return (~crc);

do
        {
            for (i=0, data=(unsigned int)0xff & *data_p++;
              i < 8;
              i++, data >>= 1)
            {
                if ((crc & 0x0001) ^ (data & 0x0001))
                    crc = (crc >> 1) ^ POLY;
                else  crc >>= 1;
            }
        } while (--length);

crc = ~crc;
        data = crc;
        crc = (crc << 8) | (data >> 8 & 0xff);
        //reverse bytes
        data= crc;
        crc= (crc<<4 & 0xf0f0) | (data >>4 & 0x0f0f);

return (crc);
}
```

"Processor" or "microprocessor" in some contexts is used to mean that a microprocessor is being used on the portable system board but may also mean that a memory block (RAM, cache, DRAM, flash memory and the like) coprocessor subsystem and the like is being used. The usage herein is that terms can also be synonymous and refer to equivalent things. The phrase "circuit" or logic array comprehends ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections, communications links circuit or signal pathways can be ohmic, capacitive, direct or indirect, via intervening circuits or otherwise. Implementation is contemplated in discrete components or fully integrated circuits in silicon, gallium arsenide, or other electronic material families, as well as in optical-based or other technology-based forms and embodiments. It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A flight training and simulation system comprising:
   a simulation workstation having a storage means, a display, an input means, and a plurality of flight data entry applications;
   a simulation cockpit having a first automated navigational device providing a plurality of flight plan entry functions, an entry terminal containing at least an input means and a display;
   a communications link between the simulation workstation and the simulation cockpit;
   an onboard Aircraft Communications And Receiving System (IACARSI) communicably coupled to the first automated navigational device; and
   a frame relay means having at least two switching positions, one switching position forming a communications bridge between the first automated navigational device and the ACARS and a second switching position forming a communications bridge between the first automated navigational device and the simulation workstation.

2. The flight training and simulation system of claim 1 wherein the simulation workstation further comprises:
   an interface board communicably coupled to the simulation cockpit via the communications link, the interface board configured to support bidirectional communications with the first automated navigational device; and
   a control application program operating on the simulation workstation and configured to operate the interface board.

3. The flight training and simulation system according to claim 2 wherein the interface board supports the ARINC 429 avionics protocol.

4. The flight training and simulation system according to claim 2 wherein the first automated navigational device is a captain's automated navigational device.

5. A flight training and simulation system according to claim 1 further comprising a second automated navigational device inside the simulation cockpit, the second automated navigational device coupled to the first automated navigational device and containing at least an input means and a display means.

6. The flight training and simulation system according to claim 5 wherein the second automated navigational device is a first officer's automated navigational device.

7. The flight training and simulation system according to claim 1 further including an instructor terminal coupled to the simulation cockpit and controllably linked to the frame relay means for operating its switching operation.

8. The flight training and simulation system according to claim 1 wherein an interface board contains an ARINC 429 transmitter/receiver chip set for transferring flight data between the first automated navigational device and the simulation workstation.

9. The flight training and simulation system according to claim 8 wherein the interface board contains a plurality of memory devices for holding intermediary data transfers between the simulation workstation and a chip set.

10. The flight training and simulation system according to claim 7 wherein the interface board further contains a plurality of logic circuits that control the flow of data.

11. The flight training and simulation system according to claim 10 wherein the interface board further comprises a plurality of latches communicably linked to the logic circuit via an address/data bus.

12. The flight training and simulation system according to claim 11 wherein the interface board further comprises an interface to a personal computer bus, wherein the latches are communicably linked to the interface board.

13. In an aircraft navigational environment using an onboard Aircraft Communications And Receiving System ("ACARS"), a system for transmitting flight data to one or more navigational devices comprising:
    a simulation workstation having a storage means, a display, an input means, a plurality of flight data entry applications and an interface board supporting a known avionics communications standard;
    a signal pathway providing a communications bridge between the interface board and the navigational devices;
    a control application program operating on the simulation workstation and configured to operate the interface board;
    an onboard Aircraft Communications And Receiving System (IACARSI) communicably coupled to the first automated navigational device; and
    a frame relay means having at least two switching positions, one switching position forming a communications bridge between the first automated navigational device and the ACARS and a second switching position forming a communications bridge between the first automated navigational device and the simulation workstation.

14. The system for transmitting flight data to one or more navigational devices according to claim 13 further comprising a relay interspersed between the navigational devices and the simulations workstation and having at least two switching positions, one switching position forming a communications bridge between a first navigational device and the ACARS and a second switching position forming a communications bridge between the navigational devices and the simulation workstation.

15. The system for transmitting flight data to one or more navigational devices according to claim 13 wherein the interface board supports the ARINC 429 standard.

16. From a workstation having an interface board to an existing simulation cockpit, a method of automatically loading one or more automated navigational devices within the simulation cockpit with a plurality of flight data found in an Aircraft Communication And Reporting System ("ACARS"), the method comprising the steps of:

entering a plurality of flight related inputs into the workstation;
 saving the flight related inputs into a simulation file;
 disconnecting the data pathway between the automated navigational devices and the ACARS;
 forming a pathway between the automated navigational devices and the workstation;
 using the workstation to request the simulation file; monitoring the data stream output from the automated navigational devices to determine if a heartbeat word from the automated navigational devices has been sent;
 encrypting a heartbeat word for the automated navigational device;
 sending a plurality of flight simulation control data to the automated navigational device via the interface board to the simulation cockpit;
 formatting the control data according to a specific avionics protocol acceptable to the automated navigational devices;
 sending the formatted control data to the interface board;
 transmitting the formatted control data to the automated navigational devices; and
 waiting for an acknowledge signal from the automated navigational devices.

17. The method of automatically loading one or more flight management computers according to claim 16 wherein the step of waiting for an acknowledge signal from the automated navigational devices is performed for a predetermined period of time and wherein the workstation aborts further transmission of data to the automated navigational devices after a predetermined number of attempts to receive an acknowledge signal.

18. The method of automatically loading one or more flight management computers according to claim 17 wherein the number of predetermined number of attempts is three.

* * * * *